June 24, 1930.    F. A. STEVENSON    1,766,468
LINED TANK
Filed Dec. 20, 1928
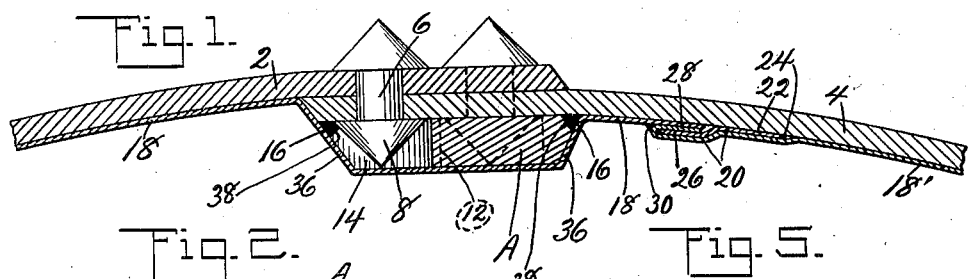
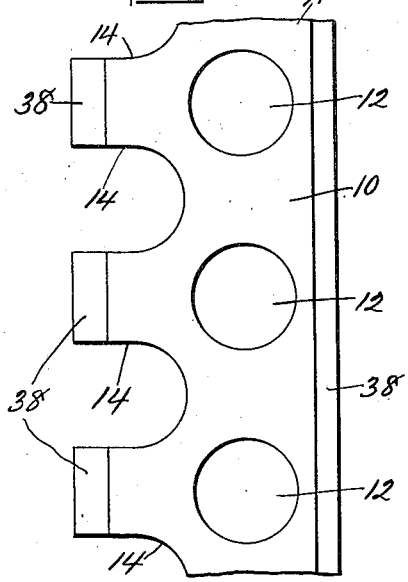 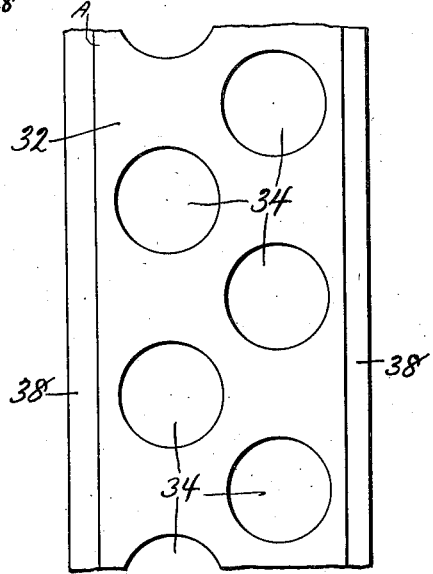
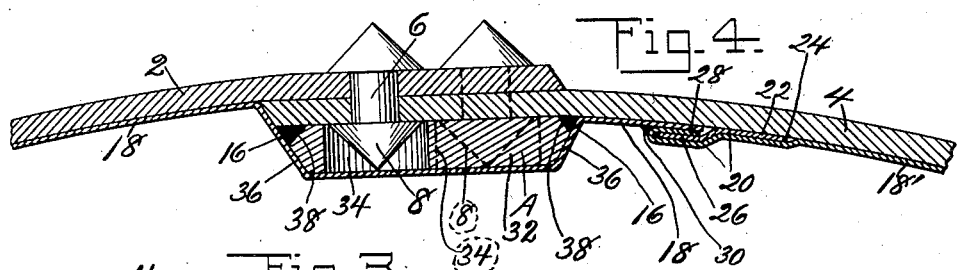
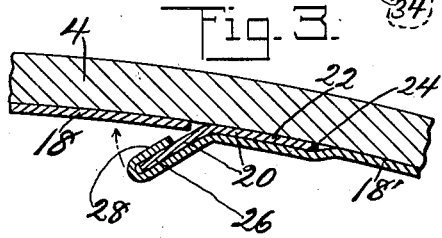
INVENTOR
*Frederick A. Stevenson*
BY
ATTORNEY Patented June 24, 1930

1,766,468

UNITED STATES PATENT OFFICE

FREDERICK A. STEVENSON, OF NEW YORK, N. Y. ASSIGNOR TO AMERICAN CAR AND FOUNDRY COMPANY, OF NEW YORK, N. Y., A CORPORATION OF NEW JERSEY

LINED TANK

Application filed December 20, 1928. Serial No. 327,246.

This invention relates generally to metallic containers, such as tanks or the like, and has particular reference to lined tanks.

Containers, such as car tanks, are usually formed of sections of steel, or other suitable metal, with the edges thereof overlapped and riveted together and, as steel readily corrodes, it is desirable to form a tank with a lining having corrosion resistant properties greater than those of steel, such, for example, as copper, aluminum, nickel, chrome iron, or other metal, and, to that end, the present invention contemplates the provision of a tank having a corrosion resistant lining.

One object of the present invention is the provision of a tank having a lining of different material and which possesses greater corrosion resistant properties than the material of the tank.

Another object of the invention is the provision of means for protecting a metallic lining for the interior of a tank against mutilation by the rivets of the tank.

A further object of this invention is the provision of means for protecting a metallic lining for the interior of a tank against mutilation by heads of the rivets connecting the tank sections, which means also serve to prevent relative movement of the lining with respect to the tank.

Other objects and advantages of this invention will be apparent from the following description taken in conjunction with the accompanying drawings in which:

Figure 1 is a sectional view through a portion of a tank, showing a riveted joint and with the lining attached to the interior of the tank;

Fig. 2 is a fragmentary plan view of one of the rivet guards used with the present invention;

Fig. 3 is a sectional view of a portion of a tank showing one form of anchoring means for the lining prior to its final position;

Fig. 4 is a sectional view similar to Fig. 1 but showing a modification of the invention; and Fig. 5 is a fragmentary plan view of a modified form of rivet guard.

Referring now more particularly to the drawings in which similar characters of reference designate similar parts in the several views, Fig. 1 shows a joint formed by the overlapping ends of tank sheets 2 and 4, the ends being fastened together by rivets 6 having heads 8. In practice, the ends 2 and 4 may be adjacent ends of a single sheet rolled to cylindrical form, or they may be separate and distinct tank sheets.

The sheets 2 and 4 may be, and preferably are, of steel to which it is desired to secure a lining such, for example, as copper, nickel, aluminum, chrome iron, or the like, and preferably a metal of different characteristics than those of the sheets 2 and 4, and which can not be readily welded to said sheets; such linings possessing greater corrosion resistant properties than those of the tank sheets.

Inasmuch as the rivet heads 8 protrude into the tank, it has been found that, if a lining was merely arranged over the heads, in use the heads would deform the lining and, therefore, this disadvantage has been eliminated by providing a rivet guard A such as shown in Figs. 2 and 5. The guard shown in Fig. 2 comprises a strip of metal 10 of a length approximating the length of the riveted joint, having a series of openings 12 adjacent one side thereof and of a size to surround one row of rivet heads. The strip is also provided along its opposite edge with cut-out portions or slots 14 arranged in staggered relation with respect to the openings 12, and adapted to receive the heads 8 of the adjacent row of rivets; it being usual in joints such as herein shown to provide a double row of rivets arranged in staggered relation with respect to each other. The guard may be formed of steel or metal of such character that it may be welded to one of the sheets, as shown at 16, whereby it is secured against displacement, and, as clearly shown in Fig. 1, the guard A is of sufficient thickness that the rivet heads do not protrude, therefore the guard serves as a backing for the metallic lining 18, which is arranged against the interior of the tank and has one end thereof arranged over the pad and extended beyond the same to a point adjacent an anchoring member 20 secured to the sheet 4. The anchoring member 20 is designed to connect adjacent lining sheets, as it is necessary to provide a connection for the sheets which will be of such character as to prevent penetration of the tank lading through the joint formed by adjacent sheets. The connection of adjacent sheets may be any one of several different forms, but, as illustrative of the invention, the joint formed by connecting two adjacent lining sheets includes an anchoring member, designated as before mentioned, at 20, in the form of an angle which extends substantially parallel to the line of rivets and has its base 22 welded, as at 24, to the sheet 4, and its other arm 26 extending into the tank and arranged at an obtuse angle with respect to the base 22, as clearly shown in Fig. 3; the arm 26 serving as a gripping portion for the end of an adjacent lining section 18', which latter is lapped over the base 22 and then folded over the arm 26 as shown at 28.

Because of the fact that the tank is usually formed of a plurality of sections or sheets, it will be apparent that the lining is formed of a plurality of sections, the number thereof being dependent, of course, on the number of sheets forming the tank; the ends of adjacent lining sections being united, for example, in a manner such as just described. It will also be apparent that the guard A serves to prevent lateral shifting of the lining.

With the lining assembled, as shown in Fig. 3, the arm 26 of the angle is then bent downwardly, carrying the folded portion of the lining therewith, to overlap the edge of the other lining section, as clearly shown in Fig. 1, and the lining section on the angle is then welded or soldered to the adjacent lining section as shown at 30.

In practice, it is desirable to weld the lining sections together, by a metal corresponding to the lining metal, in order that the tank may be lined throughout with a single metal. This may be done by an electric arc. However, it is to be understood that the lining sections may be united by gas, carbon-arc or atomic-hydrogen welding, if desired.

The invention shown in Figs. 4 and 5 is similar to that disclosed in Fig. 1, with the exception of the rivet guard. The guard shown in Fig. 5 comprises a strip 32 of suitable metal, which may be welded to the sheet 4, and it is provided with a double row of openings 34 arranged in staggered relation with respect to each other and adapted to receive the rivet heads 8. In order to eliminate sharp angles, such as right angles, the opposite edges of each of the guards shown in Figs. 2 and 5 are beveled, as shown at 36 in Figs. 1 and 4, and the upper edges are oppositely beveled, as shown at 38, whereby when the guards are arranged against the sheet 4, an angle is formed to receive the weld metal which secures the guards to the sheet 4.

From the above description, it is believed that the construction of the present invention and the method of applying the lining to the interior of the tank will be fully apparent to those skilled in the art without further elaboration, but attention is called to the fact that, as the first step in the method of the present invention, a rivet guard is attached to the interior of the tank to surround the rivet heads; the lining is then applied to the interior of the tank and positioned against one of the sections and then extended over the guard and beyond the same. The opposite edge of the lining is then engaged with an anchoring member and folded against the adjacent edge of the lining and secured thereto.

The drawings disclose the preferred embodiment of the invention, but it is understood that various changes in the form and proportions may be made within the scope of the appended claims without departing from the spirit of the invention.

What is claimed is:

1. In a tank, sheets, rivets connecting said sheets to form a longitudinal joint, a guard secured to one of said sheets at the joint and partly surrounding the rivets, and connected lining sheets in the tank, one thereof extending over the guard.

2. In a tank, sheets riveted together, a guard surrounding said rivets, a sheet of lining metal extending over said guard, and a second sheet of lining metal in the tank connected with the said first named lining sheet.

3. In a tank, overlapped sheets riveted together, a guard secured to the inner sheet and partly surrounding the rivets, and a lining of greater corrosion resistant character than that of the tank sheets arranged within the tank and comprising a metal sheet extending over the rivet guard, and a second metal sheet overlapping the adjacent edge of said first named sheet and connected thereto.

4. In a tank, overlapped sheets riveted together, a guard secured to the inner sheet and partly surrounding the rivets, and a lining of greater corrosion resistant character than that of the tank sheets arranged within the tank and comprising a metal sheet extending over the rivet guard, and a sheet extending over the rivet guard, and a second metal sheet overlapping the adjacent edge of said first named sheet and welded thereto.

5. In a tank, overlapped sheets riveted together, a guard secured to the inner sheet and partly surrounding the rivets, a lining of greater corrosion resistant character than that of the tank sheet arranged within the tank and comprising a metal sheet extending over the rivet guard, a second metal sheet overlapping the adjacent edge of the first named sheet and welded thereto by metal of the same character as that of the lining, whereby to form a tank lined wholly with a single type of metal of greater corrosion resistant characteristics than those of the tank sheet.

6. In a tank, overlapping steel sheets, fasteners connecting the sheets, a spacer attached to one of said sheets and receiving the exposed portions of the fasteners to define a backing element, and a lining for the tank comprising a metallic sheet arranged within the tank and extending over and beyond the spacer, and a second metallic sheet overlapping the first named sheet and welded thereto.

7. In a tank, sheets riveted together to form a longitudinal joint, a rivet guard secured to one of the sheets at the joint to partly surround the rivets and defining a backing element, and a lining for the tank formed of metal of greater corrosion resistant properties than those of the tank sheets comprising a sheet extending over the rivet guard and backed thereby, and a second sheet overlappingly contacting with the first mentioned sheet and welded thereto.

In witness whereof I have hereunto set my hand.

FREDERICK A. STEVENSON.